F. A. STOHLMANN.
Thermometer Cases.
No. 210,274.             Patented Nov. 26, 1878.
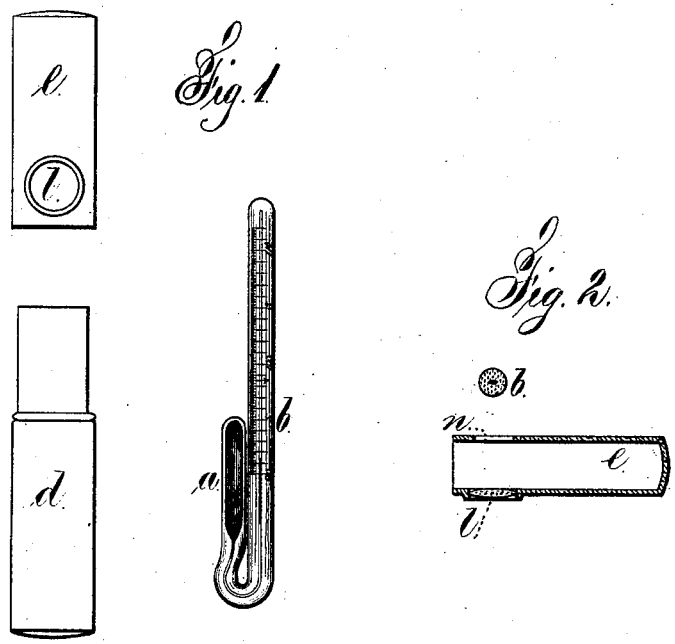

UNITED STATES PATENT OFFICE.

FREDERICK A. STOHLMANN, OF BROOKLYN, NEW YORK.

IMPROVEMENT IN THERMOMETER-CASES.

Specification forming part of Letters Patent No. 210,274, dated November 26, 1878; application filed November 4, 1878.

*To all whom it may concern:*

Be it known that I, FREDERICK A. STOHLMANN, of Brooklyn, in the State of New York, have invented an Improvement in Medical-Thermometer Cases, of which the following is a specification:

Medical thermometers are usually made with a registering portion in the tube, so as to indicate the height to which the mercury rises. A thermometer of this character is shown in Letters Patent No. 191,897, granted to me. These thermometers are necessarily small, and the divisions are usually engraved upon the glass, and it is often difficult to ascertain the temperature, especially when the light is not strong or the eye-sight of the doctor defective or weak.

My present invention is made for enabling the person using the thermometer to ascertain the point at which the register stands, and avoid the necessity of carrying a separate magnifying-glass.

I provide a case for the thermometer, and combine with the same a magnifying-glass in such a manner that the utility of the case is not injured, but the magnifying-glass is always in position to be used in examining the register of the thermometer, thus making the case perform the additional duty of a lens-holder.

In the drawing, Figure 1 is an elevation of the case as open and adjacent to the thermometer; and Fig. 2 is a section of the case, illustrating the manner in which the same is used in inspecting the thermometer.

The thermometer-bulb $a$ and index-tube $b$ are of any usual construction adapted to medical purposes. The case is made of the lower part, $d$, and sliding cover $e$, of a size and shape adapted to receive the thermometer.

The lens or magnifying-glass $l$ is inserted permanently in the case in a convenient position, so that it can be used in inspecting the register of the thermometer. I have shown such lens $l$ in one side of the case, with a hole, $n$, in the opposite side of the case to allow the thermometer to be inspected; but the said lens may be placed at the end, or in any other convenient position in the case. I prefer, however, the form shown, as the hole $n$ is closed by the part of the case that slides into the cover when the case is shut.

I claim as my invention—

The combination, with the medical-thermometer case, of a lens inserted in the said case, substantially as and for the purposes set forth.

Signed by me this 1st day of November, A. D. 1878.

FREDK. A. STOHLMANN.

Witnesses:
    GEO. T. PINCKNEY,
    WILLIAM G. MOTT.